United States Patent [19]

Miller

[11] Patent Number: 4,619,171
[45] Date of Patent: Oct. 28, 1986

[54] BEARING ASSEMBLY FOR C-ARM SCROLL SAW

[75] Inventor: David Miller, Tupelo, Miss.

[73] Assignee: Delta International Machinery Corp., Pittsburgh, Pa.

[21] Appl. No.: 757,123

[22] Filed: Jul. 19, 1985

[51] Int. Cl.$^4$ ............................................. B23D 49/00
[52] U.S. Cl. ..................................... 83/782; 83/698; 83/700
[58] Field of Search .................................. 83/769–786, 83/698, 699, 700

[56] References Cited

U.S. PATENT DOCUMENTS

| Re. 7,726 | 6/1877 | Plummer | 83/782 |
|---|---|---|---|
| 169,475 | 11/1875 | Pratt | 83/779 |
| 170,456 | 11/1875 | Smith | 83/786 |
| 189,461 | 4/1877 | House | 83/782 |
| 220,705 | 10/1879 | Dearborn | 83/782 |
| 398,803 | 2/1889 | Sedwick | 83/785 |
| 1,544,425 | 6/1925 | Blank | 83/98 |
| 1,820,294 | 8/1931 | Anderson | 83/785 |
| 1,877,705 | 9/1932 | Tautz | 83/784 |
| 2,090,195 | 8/1937 | Grob | 83/613 |
| 2,208,843 | 7/1940 | Hedgpeth | 83/752 |
| 2,692,622 | 10/1954 | Heese | 83/782 |
| 2,721,587 | 10/1955 | Dremel | 83/782 |
| 4,503,742 | 3/1985 | Sutton | 83/782 X |

OTHER PUBLICATIONS

The Eagle Precision Scroll Saw, exclusive "C" Arm for Safety, manufactured by RBI Industries, Inc., Pleasant Hill, Mo.

Primary Examiner—James M. Meister
Attorney, Agent, or Firm—Merchant, Gould, Smith, Edell, Welter & Schmidt

[57] ABSTRACT

A scroll saw is disclosed having a base with a table mounted at one end and a horizontal pivot shaft mounted at an opposite end of the base. A yoke member having upper and lower arms and a curved bight connecting the arms is mounted on the pivot shaft at the curved bight. The arms of the yoke member terminate in upper and lower ends having a saw blade connected therebetween and extending through the table, and means are provided for reciprocating the yoke member and pivot shaft to effect movement of the saw blade. The opposite ends of the pivot shaft are mounted in tapered roller bearings disposed in bearing support openings in the base. Cap members are provided at each end of the bearing assembly to hold the roller bearings and shaft in place and a wave spring is mounted between one cap and one roller bearing to apply a compressive force to the roller bearings in the direction toward the yoke to hold the bearings, pivot shaft and yoke in place. The yoke member is adjustably locked to the pivot shaft by a pair of set screws which can be released to permit axial adjustment thereof.

9 Claims, 4 Drawing Figures

BEARING ASSEMBLY FOR C-ARM SCROLL SAW

BACKGROUND OF THE INVENTION

This invention relates to jigsaws or scroll saws which have a saw blade connected between the free ends of the arms of a generally C-shaped or U-shaped member which is reciprocated about a pivot point at the closed end of the member to drive the saw blade. The base which supports the reciprocating member is usually provided with a table to support a workpiece, with the saw blade extending through an opening in the table. Prior art scroll saws of this general nature are depicted in the J. A. House U.S. Pat. No. 189,461, issued Apr. 10, 1877, the A. J. Dremel U.S. Pat. No. 2,721,587, issued Oct. 25, 1955, and the Bill E. Sutton U.S. Pat. No. 4,503,742, issued Mar. 12, 1985.

In the prior art as exemplified by the above patents, the reciprocating member is typically pivoted about a simple pin mounted on the base. The base normally includes portions which extend on opposite sides of the reciprocating member to both support the pivot pin and prevent axial movement of the reciprocating member with respect to the pivot pin. With this type of arrangement it is difficult to adjust the reciprocating member axially with respect to the pivot pin in order to center the saw blade with respect to the table, and if wear occurs in the bearing assembly after extended operation of the saw, no means are provided to compensate for the bearing wear. As a result, if the bearing assembly does become worn, the saw may excessively vibrate or may lose its ability to hold the saw blade accurately in position with respect to the table.

SUMMARY OF THE INVENTION

In the present invention, the bight of the C-arm member has an opening through which a central portion of the pivot shaft extends. The opposite sides of the bight are provided with means including adjustment screws for attaching the bight of the C-arm member to the pivot shaft. Thus, the C-arm member can quickly and easily be axially adjusted with respect to the pivot shaft to adjust the C-arm member or yoke to the exact center of the table.

The opposite ends of the pivot shaft are supported by a pair of tapered roller bearings which are spring-loaded inwardly toward the yoke. In the preferred embodiment, a wave spring is used to apply the compressive force on the roller bearings. This design eliminates any possibility of play in the bearings, even after extended use during which some bearing wear is experienced. The wave spring takes up all play in the bearings on a continuous basis.

Another advantage of roller beaings is that they will provide line contact on all bearing surfaces rather than point contact as in the case of ball bearings. The point contact of ball bearings eventually wears dimples into the races, whereas if wear does occur in the roller beaings it is evenly spread over the races such that the resulting play can be taken up by the wave spring.

DETAILED DESCRIPTION OF THE INVENTION

Figure 1:
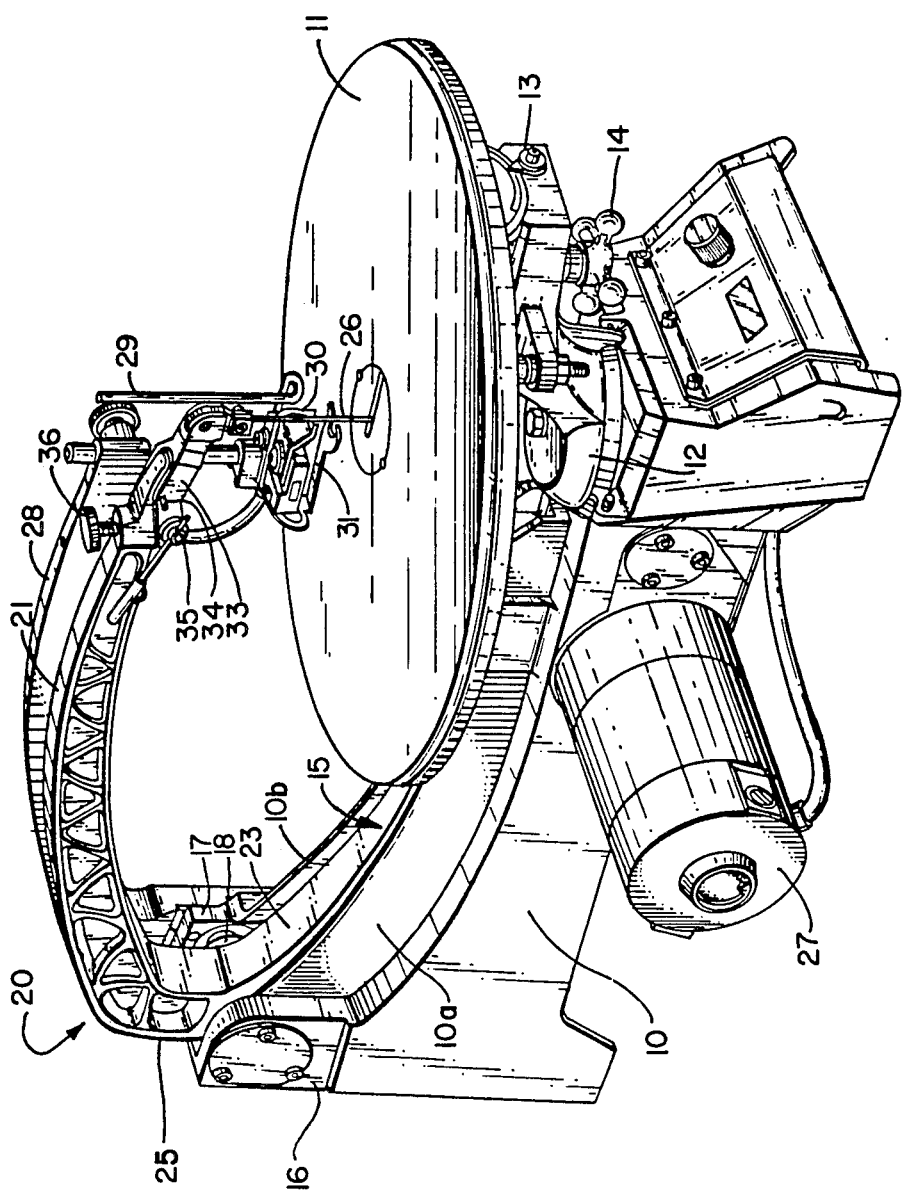
FIG. 1 is a view in perspective taken from one side and generally above a C-arm scroll saw according to my invention.
Figure 2:
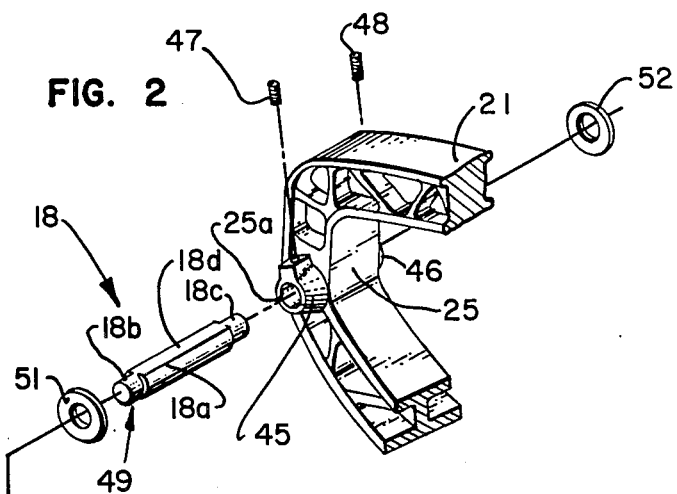
FIG. 2 is a fragmentary exploded view of the bearing assembly for the yoke of the scroll saw.
Figure 2:
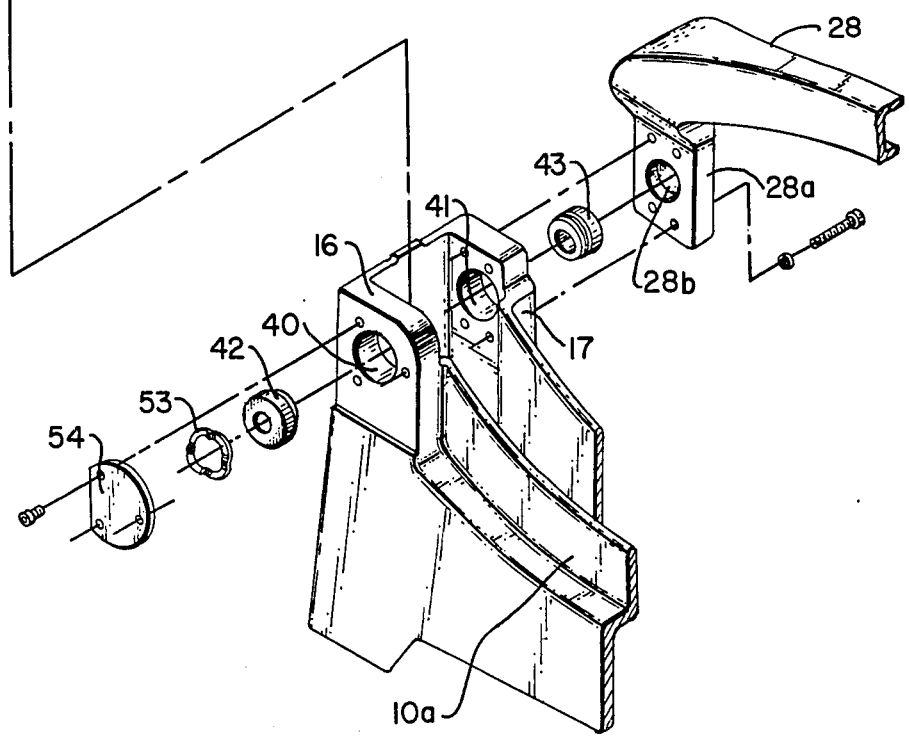

Referring now to the drawings, wherein like numerals are used throughout the several views to identify like elements of the invention, there is disclosed a scroll saw having an elongated base 10 having a table 11 mounted at one end to support a workpiece. Table 11 is mounted on a support frame including a swivel member 12 which permits the table to be rotated about a vertical axis, and a trunion assembly 13 which can be released by a star handwheel 14 to permit the table to be tilted about an axis extending generally along the length of the base 10.

Base 10 includes oppositely disposed side wall members 10a, 10b defining between them an elongated opening or well 15. At the end of base 10 opposite from table 11 side wall members 10a, 10b define a pair of upstanding, spaced bearing support members 16, 17. Mounted between the bearing support members 16, 17 for rotation therein is a horizontally extending pivot shaft 18.

A yoke or C-arm member 20 is provided having an upper arm 21 terminating in an upper end 22, a lower arm 23 terminating in a lower end 24, and a curved bight 25 connecting the upper arm 21 and the lower arm 23. Bight 25 of C-arm member 20 is mounted on pivot shaft 18. A saw blade 26 is connected between upper end 22 and lower end 24 and an electric motor 27 is provided to reciprocate C-arm member 20 on pivot shaft 18 to effect movement of the saw blade 26.

A support arm 28 connected to its rear end to bearing support member 17 extends along upper arm 21 and at its free end provides support for a blade guard 29, an air nozzle 30 and a holddown member 31.

A releasable blade tensioning device 33 is pivotally mounted to upper end 22 of upper arm 21 for pivotal movements about a horizontally extending pivot pin 34 between a blade tensioning position and a blade tension releasing position. A manually rotatable cam member 35 is mounted on the end of blade tensioning member 33 opposite from its connection to saw blade 26 for engagement with the bottom end of a manually adjustable pin 36 which extends through and is threadedly engaged with an opening in upper arm 21.

As noted above, side wall members 10a, 10b define spaced bearing support members 16, 17, which have oppositely disposed bearing support openings 40, 41 therein. Bearing support openings 40, 41 are axially aligned, circular openings sized to accept and support a pair of oppositely disposed tapered roller bearings 42, 43 therein.

Horizontally extending pivot shaft 18 has a central portion 18a and opposite end portions 18b, 18c. Pivot shaft 18 has an axially extending flat surface 18d formed along one side thereof which lies in a plane parallel to the axis of pivot shaft 18.

Pivot shaft 18 extends through an opening 25a in bight 25 of yoke member 20. A pair of hubs 45, 46 are integrally formed on opposite sides of bight 25 around opening 25a to provide a longer hub to support yoke 20 on shaft 18. A pair of set screws or adjustment screws 47, 48 are mounted in hubs 45, 46 respectively perpendicular to the axis of opening 25a, the set screws 47, 48 being engageable with the flat surface 18d to fix the yoke 20 both axially and rotatably with respect to pivot shaft 18. Yoke 20 can thus be adjusted axially with respect to pivot shaft 18 to center saw blade 26 on table 11.

As noted above, pivot shaft 18 includes end portions 18b, 18c which are reduced in diameter with respect to central portion 18a, thereby defining a pair of abutments 49, 50 at the junctures of the two end portions and the central portion. A pair of steel washers 51, 52, having openings sized to fit end portions 18b, 18c are mounted thereon against abutments 49, 50. End portions 18b, 18c extend into the central openings of roller bearings 42, 43 where they are supported for rotation.

Support arm 28 has at its rear end a downwardly extending support member 28a which is bolted to bearing support member 17. Support member 28a has a flat face which lies against the outer surface of bearing support member 17 to hold roller bearing 43 and prevent it from moving axially outwardly from opening 41. An opening 28b is provided in the face of support member 28a in line with roller bearing 43, but it is of smaller diameter and is simply designed to hold a supply of lubricant for the bearing. The outer end of roller bearing 43 is thus held essentially flush with the outer surface of bearing support member 17.

The outer end of roller bearing 42 is also held generally flush with the outer surface of bearing support member 16 by means of a wave washer 53 and a cap 54 bolted over it to bearing support member 16. Wave spring 53 is a generally flat but wavy, circular spring having a diameter corresponding generally to the diameter of roller bearing 42. Wave spring 53 fits against the outer end of roller bearing 42 and is compressed thereagainst by cap 54, which holds wave spring 53 in place and in a partially compressed condition against roller bearing 42. Wave spring 53 thus applies an inwardly directed force to roller bearing 42 to hold the bearings 42, 43, pivot shaft 18 and C-arm member 20 in place. It can be seen that both roller bearings 42, 43 and the respective washers 51, 52 are held tightly in place against abutments 49, 50 by wave spring 53 which thus applies a compressive force to the roller bearings in the direction toward yoke 20.

Figure 3:
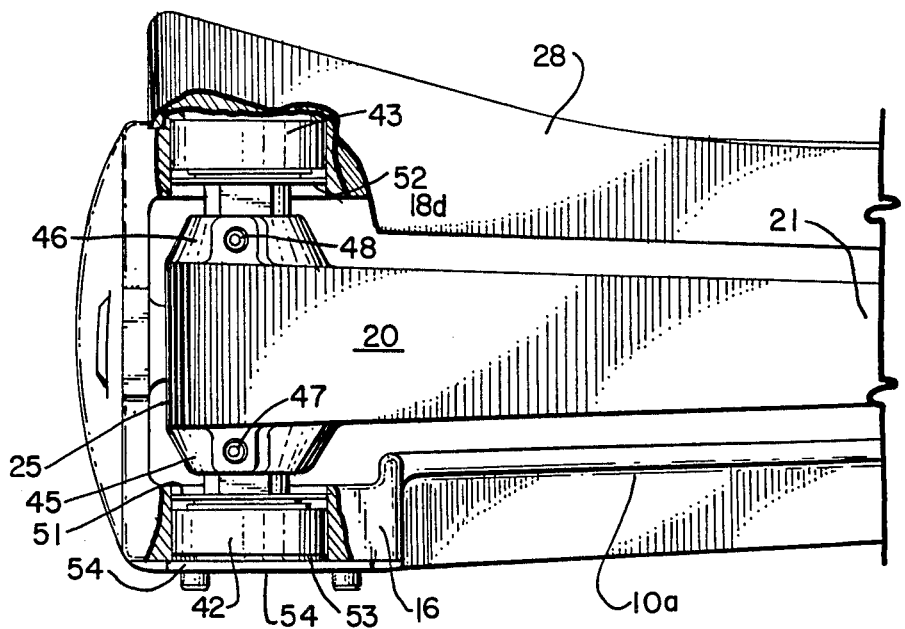
FIG. 3 is an enlarged, fragmentary view of the bearing assembly taken from above the bearing assembly, portions thereof being broken away.
Figure 4:
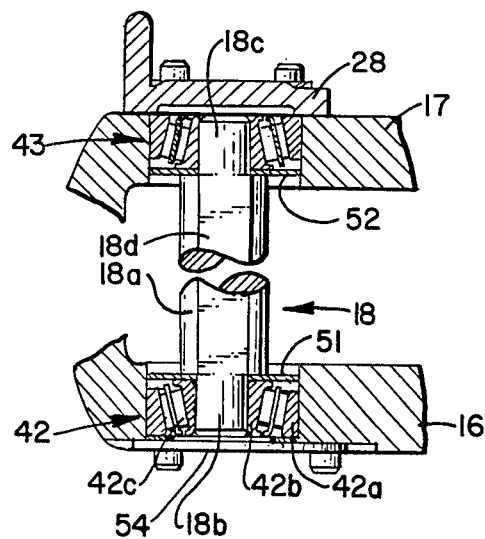
FIG. 4 is a schematic representation, in section, of a tapered roller bearing of the type used in the bearing assembly.

The assembled bearing assembly is best shown in FIG. 3, and a schematic representation of the tapered roller bearings is shown in FIG. 4. Roller bearing 42 has an outer frusto-conical race 42a and an inner frusto-conical race 42b with a plurality of rollers 42c held between them. The inner diameter of outer race 42a increases in the direction toward yoke 20 and the other roller bearing, and the outer diameter of inner race 42b increases in the same direction. Thus, an axial force applied against the outer end of roller bearing 42 toward the center of the unit acts not only to force the roller bearing against the abutment on pivot shaft 18 but also to tighten the bearing itself by forcing outer race 42a against rollers 42c which in turn are pressed against inner race 42b. Thus, wave spring 53 functions to apply a compressive force to the roller bearings 42, 43 in the direction toward the yoke 20 to hold the assembly in place and also to take up any slack in the roller bearings themselves as they wear.

I claim:

1. A scroll saw, comprising:
(a) a base having a table mounted at one end and a horizontal pivot shaft, having a central portion and opposite ends, mounted at an opposite end of said base;
(b) a C-arm member having upper and lower arms and a curved bight connecting said arms, said arms terminating in upper and lower ends having a saw blade connected therebetween and extending through said table;
(c) means mounting said C-arm member on said pivot shaft at said curved bight including an opening in said bight, means for reciprocating said C-arm member and said pivot shaft to effect movement of said saw blade; and
(d) said base comprising a pair of spaced side wall members having a pair of upstanding bearing support members at said opposite end of said base, with oppositely disposed bearing support openings therein, tapered roller bearings in said openings to support said opposite ends of said pivot shaft, means for adjustably locking said bight to said central portion of said pivot shaft extending therethrough, and means including resilient means on said bearing support members applying an inwardly directed force to said bearings to hold said bearings, pivot shaft and C-arm member in place.

2. The scroll saw of claim 1 wherein said central portion of said pivot shaft has an axially extending flat surface, and wherein said means for adjustably locking said bight to said pivot shaft includes a pair of hubs on opposite sides of said bight around said opening, and adjustment screws in said hubs engageable with said flat surface, whereby said C-arm member can be fixed both axially and rotatably with respect to said pivot shaft.

3. The scroll saw of claim 1 wherein said pivot shaft includes end portions reduced in diameter with respect to said central portion, defining a pair of abutments therebetween, for limiting inward movements of said roller bearings, and said resilient means includes a wave spring engaging at least one of said roller bearings.

4. The scroll saw of claim 3 wherein means are provided to block outward axial movement of one said roller bearing and an associated end of said pivot shaft, said wave spring being a generally flat and wavy, circular member positioned to engage the other of said roller bearings, and a cover member secured to an associated bearing support member to hold said wave spring in place and in a partially compressed condition against said other roller bearing.

5. A scroll saw, comprising:
(a) a base having a table and spaced therefrom a pair of bearing support members with oppositely disposed bearing support openings therein;
(b) tapered roller bearings in said openings;
(c) a pivot shaft, having a central portion and having opposite ends rotatably mounted in said roller bearings;
(d) a yoke member having upper and lower arms and a bight connecting said arms, said arms having upper and lower ends having a saw blade connected therebetween and extending through said table;
(e) means mounting said yoke member on said pivot shaft at said bight including an opening in said bight, means for reciprocating said yoke member and said pivot shaft to effect movement of said saw blade;
(f) means for releasably and adjustably locking said bight to said central portion of said pivot shaft extending therethrough; and (g) means including resilient means on said bearing support members for applying a compressive force to said roller bearings in the direction toward said yoke to hold said bearings, pivot shaft and yoke in place.

6. The scroll saw of claim 5 wherein said means for releasably and adjustably locking said bight to said central portion of said pivot shaft includes a pair of hubs on opposite sides of said bight around said opening therein, and set screws in said hubs engageable with said central portion of said pivot shaft, whereby said yoke member can be fixed both axially and rotatably with respect to said pivot shaft.

7. The scroll saw of claim 5 wherein said pivot shaft includes abutments between said end portions and said central portion of said pivot shaft for limiting inward movements of said roller bearings.

8. The scroll saw of claim 7 wherein said resilient means includes a wave spring engaging an outer end of one of said roller bearings.

9. The scroll saw of claim 8 wherein means are provided to block outward axial movement of one said roller bearing and an associated end of said pivot shaft, said wave spring being a generally flat and wavy, circular member positioned to engage the other of said roller bearings, and means secured to an associated bearing support member to hold said wave spring in place and in a partially compressed condition against said other roller bearing.

* * * * *